United States Patent [19]

Harvey

[11] Patent Number: 4,652,104
[45] Date of Patent: Mar. 24, 1987

[54] PSEUDO FORMAT CAMERA WITH ZOOM FINDER

[75] Inventor: Donald M. Harvey, Webster, N.Y.

[73] Assignee: Eastman Kodak Company, Rochester, N.Y.

[21] Appl. No.: 743,470

[22] Filed: Jun. 11, 1985

[51] Int. Cl.$^4$ ............................................. G03B 17/24
[52] U.S. Cl. ..................................... 354/106; 354/222
[58] Field of Search .............. 354/105, 106, 219, 222, 354/224, 225, 199, 200, 151, 166; 355/39, 40

[56] References Cited

U.S. PATENT DOCUMENTS

| | | | |
|---|---|---|---|
| 2,187,246 | 1/1940 | Nerwin | 354/222 X |
| 3,200,699 | 8/1965 | Graves | 88/1.5 |
| 3,212,422 | 10/1965 | Nerwin et al. | 354/199 |
| 3,490,844 | 1/1970 | Sapp, Jr. | 355/40 |
| 4,195,924 | 4/1980 | Stemme et al. | 354/197 |
| 4,357,102 | 11/1982 | Taren et al. | 355/77 |
| 4,478,493 | 10/1984 | Yokota | 350/336 |
| 4,583,831 | 4/1986 | Harvey | 354/106 |

Primary Examiner—L. T. Hix
Assistant Examiner—Brian W. Brown
Attorney, Agent, or Firm—Roger A. Fields

[57] ABSTRACT

A photographic camera enables pseudo telephoto prints to be obtained from normal exposures, coded to identify a selected telephoto field. In the camera, an objective lens is adjustable to change its angular field of view within a field range having a moderate telephoto limit. A viewfinder has a finder lens which is adjustable to change its angular field of view to a plurality of telephoto fields narrower than the possible fields of the objective lens. The objective lens and the finder lens are coupled to adjust the finder lens selectively to the narrower telephoto fields when the objective lens is at its telephoto limit. Code means, responsive to adjustment of the finder lens to a selected telephoto field, encodes an exposure taken with the objective lens at its telephoto limit with indicia repreaentative of the selected telephoto field. Thus the portion of the exposure covered by the selected telephoto field can be identified for enlargement to produce a pseudo telephoto print.

9 Claims, 8 Drawing Figures

| OPERATING MODE | PSEUDO PAN | ACTUAL ZOOM | | | | PSEUDO TELE (ZOOM) | | |
|---|---|---|---|---|---|---|---|---|
| CAMERA OBJECTIVE: | | | | | | | | |
| ACTUAL FOCAL LENGTH | 35mm | 35mm | ↕ | 80mm | | 80mm | 80mm | 80mm |
| EQUIVALENT FOCAL LENGTH | 35mm | 35mm | ↕ | 80mm | SAME AS ACTUAL | 120mm | 160mm | 200mm |
| MAGNIFICATION | 1.0X | 1.0X | ↕ | 2.3X | | 2.3X | 2.3X | 2.3X |
| CAMERA FINDER: | | | | | | | | |
| ACTUAL FOCAL LENGTH | 35mm | 35mm | ↕ | 80mm | ↕ | 120mm | 160mm | 200mm |
| MAGNIFICATION | 1.0X | 1.0X | ↕ | 2.3X | | 3.4X | 4.6X | 5.7X |
| FINDER IMAGE | | | | | | | | |
| WIDTH-TO-LENGTH RATIO | 1:2 | 3½:5 | | 3½:5 | | 3½:5 | 3½:5 | 3½:5 |
| PORTION OF NEGATIVE USED TO MAKE PRINT | 16.4×32.8mm | 23×32.8mm | | 23×32.8mm | | 16.4×23.4mm | 12.8×16.3mm | 9.2×13.1mm |
| PRINT SIZE | 3½×7ins | 3½×5ins | | 3½×5ins | | 3½×5ins | 3½×5ins | 3½×5ins |
| CODE FIDUCIAL | 1000 | 0000 | | 0000 | | 0100 | 0010 | 0001 |

FIG. 7

PSEUDO FORMAT CAMERA WITH ZOOM FINDER

CROSS REFERENCE TO A RELATED APPLICATION

Reference is made to commonly assigned, copending patent application Ser. No. 717,053 filed Mar. 28, 1985 in the name of Donald M. Harvey and entitled PSEUDO TELEPHOTO—PSEUDO PANORAMIC CAMERA.

BACKGROUND OF THE INVENTION

1. Field of the Invention

The invention relates generally to a camera for enabling pseudo telephoto and pseudo panoramic prints to be obtained from normal exposures by coding an exposure to identify a selected pseudo format. More particularly, the invention relates to a zoom finder in the camera for viewing the selected pseudo format.

2. Description of the Prior Art

A pseudo telephoto print is one that is made from a central portion of an exposure having the same width-to-length ratio, e.g., 3½:5, as that of the exposure. During the printing process the negative is masked at its upper, lower, left and right marginal zones, leaving the central portion of the negative unmasked. Alternatively, the film gate in the enlarger may be correspondingly masked or adjusted. Then, an enlargement is made of the unmasked portion of the negative to provide a print with the same width-to-length ratio as that of the unmasked portion. Thus the print will have a telephoto or close-up format.

A pseudo panoramic print is one that is made from a narrow portion of an exposure having a greater width-to-length ratio, e.g., 1:3, than that of the exposure. During the printing process the negative is masked at its upper and/or lower marginal zones, leaving the narrow portion of the negative unmasked. Alternatively, the film gate in the enlarger may be correspondingly masked or adjusted. Then, an enlargement is made of the unmasked portion of the negative to provide a print with the same width-to-length ratio as that of the unmasked portion. Thus the print will have a panoramic or elongate format.

Commonly assigned U.S. Pat. No. 3,490,844 granted Jan. 20, 1970 discloses a method of making a print of a selected portion of a subject to be photographed. The method comprises the following steps: (1) viewing the subject in the viewfinder of a camera; (2) manually adjusting mechanical masking members visible in the viewfinder to frame a selected portion of the subject; (3) exposing the film in the camera to obtain a latent image of the subject; (4) encoding the exposure on the film with indicia representative of the selected portion of the subject; (5) processing the film to obtain a negative of the latent image of the subject; and (6) sensing the indicia to make a print of the selected portion of the subject from the negative.

When in U.S. Pat. No. 3,490,844 the selected portion of the subject has the same relative position in the viewfinder as a corresponding portion of the exposure, enlargement of the portion in the negative will provide a pseudo telephoto effect similar to the actual telephoto effect provided by a telephoto lens. Thus a pseudo telephoto print can be made during the printing process from an exposure taken without a telephoto lens.

Another patent, U.S. Pat. No. 4,357,102 granted Nov. 2, 1982, discloses a method of making a pseudo panoramic print from an exposure. According to the method, a window in the viewfinder of a camera has its upper and/or lower marginal zones masked off by an appropriate insert to provide a viewing area with a width-to-length ratio greater than 1:2 and preferably 1:3. Exposures are taken with the window partially masked and, during the printing of the negatives, the film gate in the enlarger is correspondingly masked or provided with an aperture of the same width-to-length ratio as that of the unmasked portion of the window. Printing paper with a similar width-to-length ratio is used. Prints can thus be obtained which have a panoramic or elongate format without using a panoramic lens.

Although U.S. Pat. No. 3,490,844 discloses a method of making a pseudo telephoto print from an exposure taken without a telephoto lens, and U.S. Pat. No. 4,357,102 discloses a method of making a pseudo panoramic print from an exposure taken without a panoramic lens, in each instance the exposure is made using an objective lens having a single or fixed focal length, probably around 45 mm. A 45 mm lens is a normal lens, as distinguished from a telephoto or wide angle lens, and is chosen to enable normal prints as well as pseudo telephoto or pseudo panoramic prints to be obtained.

DESCRIPTION OF THE CROSS-REFERENCED APPLICATION

My previously filed application cross-referenced above discloses a camera for taking exposures for use in producing pseudo telephoto and pseudo panoramic prints. The camera makes it possible to obtain a pseudo telephoto print from an exposure taken with the objective lens set at a moderate telephoto focal length, e.g., 80 mm, and to obtain a pseudo panoramic print from an exposure taken with the objective lens set at a wide angle focal length, e.g., 28 mm. This is in addition to obtaining normal prints from exposures taken with the objective lens set at a normal focal length, e.g., 50 mm. By providing a plurality of focal lengths for the objective lens, a greater range of pseudo telephoto and pseudo panoramic effects can be obtained as compared to the prior art devices shown in U.S. Pat. Nos. 3,490,844 and 4,357,102.

In the camera, an objective lens is adjustable to vary its angular field of view within a field range having a wide angle limit, i.e., 28 mm, and a moderate telephoto limit, i.e., 80 mm. A manually operated member is movable to a plurality of positions corresponding to respective fields of view within the field range of the objective lens, to adjust the lens to a selected field of view within such field range. Also, the manually operated member is movable to other positions corresponding to respective pseudo telephoto or pseudo panoramic fields of view outside the field range of the objective lens, when the lens is adjusted to the telephoto limit or the wide angle limit. Code means, responsive to movement of the manually operated member to a position corresponding to a pseudo telephoto or pseudo panoramic field of view, encodes an exposure taken with the objective lens at its wide angle or telephoto limit with indicia representative of the pseudo field of view. This enables the portion of the negative covered by the pseudo field of view to be identified for enlargement to produce a pseudo telephoto or pseudo panoramic print.

A liquid crystal display (LCD) masking unit is located in the viewfinder of the camera to provide various masking configurations in the finder field to frame a selected portion of a subject to be photographed. The respective masking configurations of the LCD correspond to the pseudo telephoto and pseudo panoramic settings of the manually operated member. When the LCD is energized in accordance with the respective settings of the manually operated member, the LCD is rendered opaque to partially mask the finder field in various degrees. Thus the particular pseudo telephoto or pseudo panoramic format associated with the selected setting of the manually operated member may be viewed in the unmasked portion of the finder field.

SUMMARY OF THE INVENTION

Since the camera disclosed in my cross-referenced application uses a masking unit to partially mask the finder field in accordance with the selected pseudo telephoto setting, the view through the viewfinder is limited to the unmasked portion of the finder field. My invention improves such a camera by providing (in place of the masking unit) a finder lens in the viewfinder which is adjustable to change its angular field of view to respective actual telephoto fields that define the pseudo telephoto formats. As a result, a selected pseudo telephoto format can be viewed in the full field of the viewfinder rather than in an unmasked portion of the finder field. This makes it possible for the viewfinder to show a full natural-size image of the subject to be photographed, which means that the view through the viewfinder can be on the same scale as the view with the unaided eye.

The finder lens and the objective lens are coupled to automatically adjust the finder lens selectively to the actual telephoto fields that define the pseudo telephoto formats when the objective lens is at its telephoto limit. A selected pseudo telephoto format is then viewed in the full field of the viewfinder, and an exposure is taken with the objective lens at its telephoto limit. Code means, responsive to adjustment of the finder lens to the selected telephoto field, encodes the exposure with code indicia representative of the selected telephoto field. Thus the portion of the exposure covered by the selected telephoto field can be identified for enlargement to produce a pseudo telephoto print.

In a preferred embodiment of the invention, the viewfinder is a direct-view optical viewfinder having a finder lens which is adjustable to change its angular field of view to respective fields within the field range of the objective lens, as well as the various telephoto fields (outside the field range) that define the pseudo telephoto formats. The finder lens and the objective lens are coupled to adjust the two lenses to the same field (within the field range of the objective lens) to view the selected field in the viewfinder. When the objective lens is at its telephoto limit, the finder lens may be adjusted to a selected telephoto field that defines a pseudo telephoto format, to view the pseudo format in the viewfinder. In either instance, the viewfinder can show a full natural-size image of the subject to be photographed.

BRIEF DESCRIPTION OF THE DRAWINGS

The invention will be described in connection with the drawings, wherein.

DESCRIPTION OF THE PREFERRED EMBODIMENT

The invention is disclosed as being embodied in a 35 mm still picture camera. Because such a camera is well known, this description is directed in particular to photographic elements forming part of or cooperating directly with the disclosed embodiment. It is to be understood, however, that other elements not specifically shown or described may take various forms known to persons of ordinary skill in the art.

Figure 1:
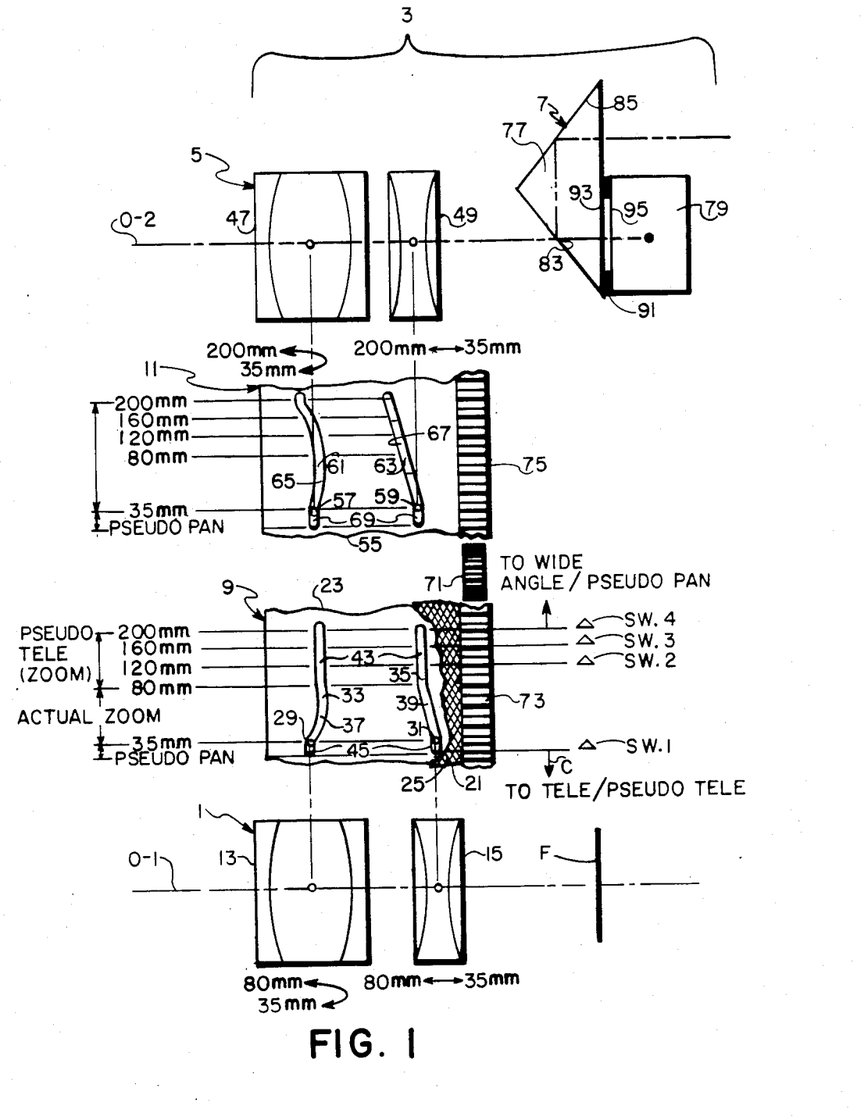
FIG. 1 is a diagram of a zoom objective lens, a zoom finder lens and manually operated means for adjusting the two lenses in a 35 mm camera which takes exposures for use in producing pseudo telephoto prints, in accordance with a preferred embodiment of the invention.

Referring now to the drawings, and in particular in FIG. 1, there is shown a composite of certain details of a still picture camera for use with 35 mm film, such as the various color print films manufactured by Eastman Kodak Company. The camera includes an objective lens 1 for focusing an image of a subject being photographed on a frame section F of the film. Conventional means, such as a pressure plate and a pair of rails, not shown, support the frame section F in the focal plane of the objective lens to take the exposure. A direct-view (eye-level) optical viewfinder 3 in the camera includes a finder lens 5 and a Porro prism assembly 7 for viewing an erect image of the subject being photographed. Respective manually operated means 9 and 11 are disposed about the objective lens 1 and the finder lens 5 for adjusting the two lenses before taking the exposure.

The objective lens 1 in the camera is a known type of zoom lens, that is, a lens of variable focal length which can be adjusted continuously by movement of separate groups of elements in the lens to change the focal length of the lens. This is done in order to vary the angular field of view (coverage) of the objective lens 1 between a wide-angle limit and a telephoto limit. Alternatively, a lens assembly may be provided having a plurality of interchangable elements for changing the focal length. As shown in FIG. 1, the objective lens 1 includes a front element section 13 which moves in a double action path along the optical axis O-1, first back (rearward) and then forward as the focal length of the lens is changed from a wide angle limit of, for example, 35 mm, to a moderate telephoto limit of, for example, 80 mm. Conversely, a rear element section 15 of the objective lens 1 moves forward along the optical axis O-1 in an almost smooth, linear path as the focal length of the lens is adjusted from 35 mm to 80 mm. At the shortest focal length of the objective lens 1, i.e., the wide-angle limit 35 mm, the front and rear sections 13 and 15 of the lens are farthest apart and the angular field of view is approximately 63°. At the longest focal length of the objective lens 1, i.e., the moderate telephoto limit 80 mm, the angular field of view is approximately 28°.

Figure 3:
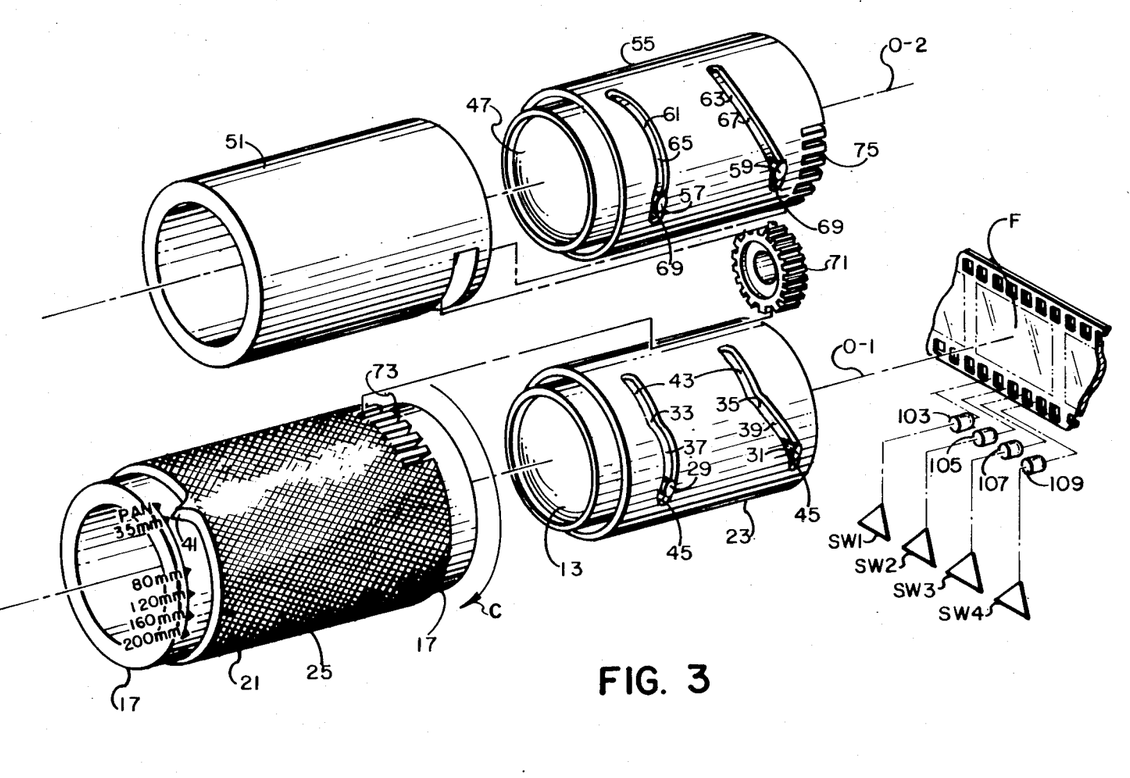
FIG. 3 is a partially exploded perspective view of the zoom objective lens, the zoom finder lens and the manually operated means depicted in FIG. 1.
Figure 4:
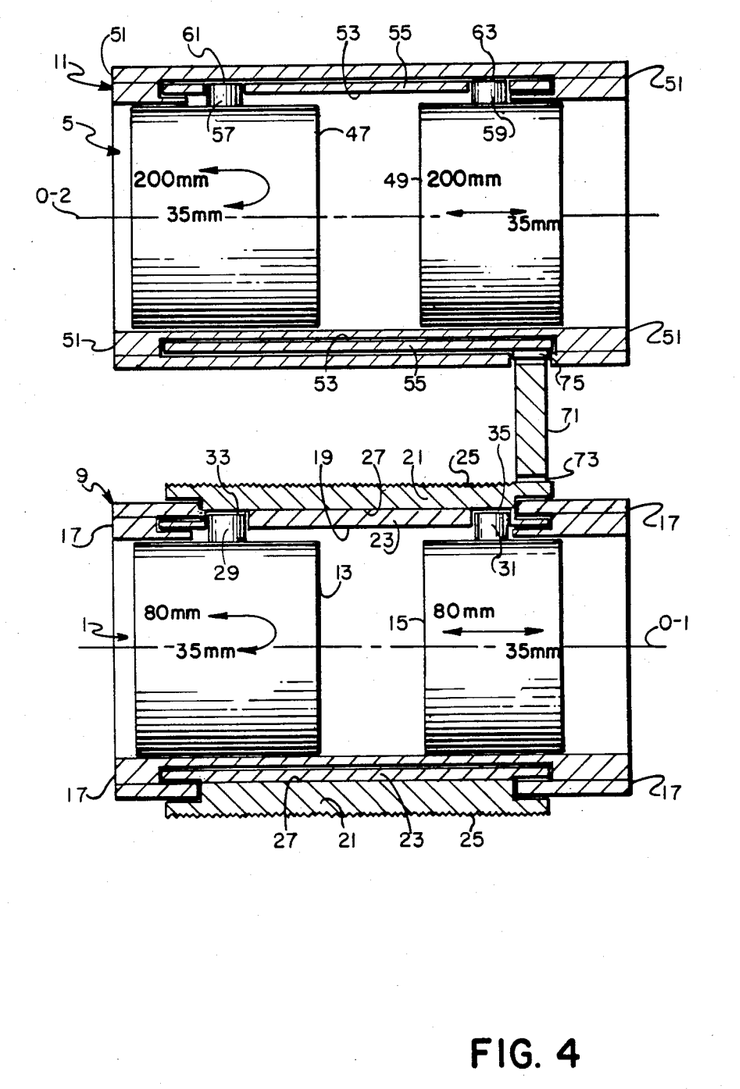
FIG. 4 is a partial sectional view of the two lenses and the manually operated means.

The manually operated means 9 for moving the front and rear sections 13 and 15 of the objective lens 1 to adjust the lens to a selected focal length from 35 mm to 80 mm is shown in FIGS. 1, 3 and 4. FIG. 1 shows the manually operated means 9 in a rolled-out (flat) elevational form. FIG. 3 shows such means 9 in an exploded perspective form. FIG. 4 shows the means 9 in a sectional form. As seen in FIG. 4, a cylindrical barrel 17 fixed to the camera body, not shown, supports the front and rear sections 13 and 15 of the objective lens 1 for movement along the optical axis O-1. The fixed barrel 17 has a semi-annular opening 19 which is bridged in light-trapping relation by an exterior zoom ring 21 and an interior cam ring 23. The zoom ring 21 has a knurled outer surface 25 and is secured at an inner surface 27 to the cam ring 23. The respective rings 21 and 23 are supported on exterior and interior surfaces of the barrel 17 for rotation relative to the barrel, about the front and rear sections 13 and 15 of the objective lens 1. The front and rear sections 13 and 15 have respective cam followers 29 and 31 which project into different-shaped cam slots 33 and 35 in the cam ring 23, to adjust the objective lens 1 from its 35 mm focal length to its 80 mm focal length. The different shape of the cam slots 33 and 35, and respective settings of the cam ring 23 for adjusting the objective lens 1 to the 35 mm focal length and the 80 mm focal length, are depicted in FIG. 1. When, as viewed in FIGS. 1 and 3, the cam ring 23 is rotated in a clockwise direction C (by turning the zoom ring 21 in the same direction) from the 35 mm setting to the 80 mm setting of the cam ring, the front section 13 of the objective lens 1 first moves rearward and then moves forward because of a curved segment 37 of the cam slot 33. Simultaneously, the rear section 15 of the objective lens 1 simply moves forward because of a straight, inclined segment 39 of the cam slot 35. This movement of the front and rear sections 13 and 15 adjusts the objective lens 1 to continuously change its focal length from 35 mm to 80 mm.

A pointer 41 is provided on the zoom ring 21 for alignment with respective indications of the 35 mm and 80 mm settings of the cam ring 23. As shown in FIG. 3, the indications are embossed on the outside of the cylindrical barrel 17.

As is apparent from FIG. 1, the cam ring 23 can be rotated in the clockwise direction C beyond its 80 mm setting (by similarly turning the zoom ring 21) to a plurality of pseudo telephoto settings 120 mm, 160 mm and 200 mm, without moving the objective lens 1 from its longest (telephoto) focal length 80 mm. This is possible because of respective, non-inclined, identical dwell segments 43 in the two cam slots 33 and 35. Conversely, the cam ring 23 can be rotated in a counter-clockwise direction beyond its 35 mm setting (by similarly turning the zoom ring 21) to a pseudo panoramic setting, without moving the objective lens 1 from its shortest (wide-angle) focal length 35 mm. This is possible because of respective, non-inclined, identical dwell segments 45 in the two cam slots 33 and 35. Indications of the pseudo telephoto settings 120 mm, 160 mm and 200 mm of the cam ring 23 and the pseudo panoramic setting of the cam ring are embossed on the outside of the cylindrical barrel 17, beyond the 80 mm and 35 mm indications on the barrel, for alignment with the pointer 41 on the zoom ring 21.

Like the objective lens 1, the finder lens 5 is a known type of zoom lens which can be adjusted continuously by movement of separate groups of elements to change its focal length. This is done in order to vary the angular field of view (coverage) of the finder lens 5 between a wide-angle limit and a telephoto limit. Alternatively, a lens assembly may be provided having a plurality of interchangable elements for changing the focal length. As shown in FIG. 1, the finder lens 5 includes a front element section 47 which moves in a double action path along the optical axis O-2, first back (rearward) and then forward as the focal length of the lens is changed from a wide angle limit of, for example, 35 mm, to a telephoto limit of, for example, 200 mm. Conversely, a rear element section 49 of the finder lens 5 moves forward along the optical axis O-2 in an almost smooth, linear path as the focal length of the lens is adjusted from 35 mm to 200 mm. At the shortest focal length of the finder lens 5, i.e., the wide-angle limit 35 mm, the front and rear sections 47 and 49 of the lens are farthest apart and the angular field of view is approximately 63°. At the longest focal length of the finder lens 5, i.e., the telephoto limit 200 mm, the angular field of view is 12.5°.

The manually operated means 11 for moving the front and rear sections 47 and 49 of the finder lens 5 to adjust the lens to a selected focal length from 35 mm to 200 mm is shown in FIGS. 1, 3 and 4. As seen in FIG. 4, a cylindrical barrel 51 fixed to the camera body supports the front and rear sections 47 and 49 of the finder lens 5 for movement along the optical axis O-2. The fixed barrel 51 has an internal, annular cut-out 53 in which is located a cam ring 55. The cam ring 55 is supported in the cut-out 53 for rotation relative to the barrel 51, about the front and rear sections 47 and 49 of the finder lens 5. The front and rear sections 47 and 49 have respective cam followers 57 and 59 which project into different-shaped cam slots 61 and 63 in the cam ring 55, to adjust the finder lens 5 from its 35 mm focal length to its 200 mm focal length. The different shape of the cam slots 61 and 63, and respective settings of the cam ring 55 for adjusting the finder lens 5 to the 35 mm and 200 mm focal lengths, as well as to several intermediate focal lengths 80 mm, 120 mm and 160 mm, are depicted in FIG. 1. When, as viewed in FIGS. 1 and 3, the cam ring 55 is rotated in the clockwise direction C from the 35 mm setting to the 200 mm setting of the cam ring, the front section 47 of the finder lens 5 first moves rearward and then moves forward because of a curved segment 65 of the cam slot 61. Simultaneously, the rear section 49 of the finder lens 5 simply moves forward because of a straight, inclined segment 67 of the cam slot 63. This movement of the front and rear sections 47 and 49 adjusts the finder lens 5 to continuously change its focal length from 35 mm to 200 mm.

As is apparent from FIG. 1, the cam ring 55 can be rotated in a counter-clockwise direction opposite to the direction C beyond its 35 mm setting to a pseudo panoramic setting, without moving the finder lens 5 from its shortest (wide-angle) focal length 35 mm. This is possible because of respective non-inclined, identical dwell segments 69 in the two cam slots 61 and 63.

A gear 71 couples the manually operated means 9 for adjusting the objective lens 1 to a selected focal length and the manually operated means 11 for adjusting the finder lens 5 to a selected focal length, in a manner such that rotation of the zoom ring 21 to rotate the cam ring 23 for the objective lens will cause the cam ring 55 for the finder lens to be similarly rotated. As shown in FIGS. 1, 3 and 4, the gear 71 engages an arcuate array of teeth 73 on the zoom ring 21 and a like array of teeth 75 on the cam ring 55. When the zoom ring 21 is rotated in the clockwise direction C to move its pointer 41 from alignment with the "35 mm" indication on the fixed barrel 17 to alignment with the "80 mm" indication on the barrel, the objective lens 1 and the finder lens 5 are adjusted continuously from 35 mm focal lengths to 80 mm focal lengths and the cam rings 23 and 55 are adjusted to similar settings, shown in FIG. 1. When the zoom ring 21 is rotated in the clockwise direction C to move its pointer 41 from alignment with the "80 mm" indication on the barrel 17 to successive alignment with the "120 mm", "160 mm" and "200 mm" indications on the barrel, the finder lens 5 is adjusted continuously from the 80 mm focal length to a 200 mm focal length and the cam rings 23 and 55 are adjusted to similar settings. However, the objective lens 5 remains stationary at its 80 mm focal length. When the zoom ring 21 is rotated in a counter-clockwise direction to move its pointer 41 from alignment with the "35 mm" indication on the barrel 17 to alignment with the "PAN" indication on the barrel, the cam rings 23 and 55 are adjusted to similar settings. However, the objective lens 1 and the finder lens 5 remain stationary at their 35 mm focal lengths.

Figure 2:
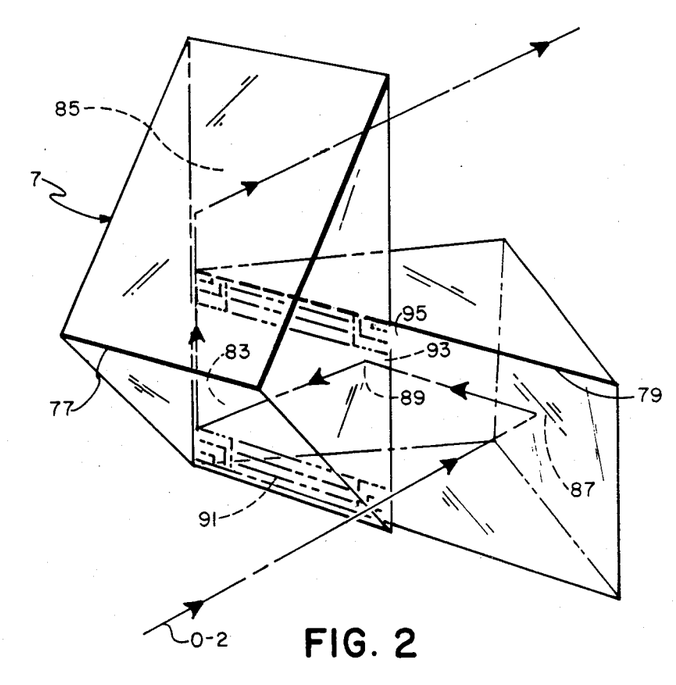
FIG. 2 is a perspective view of a Porro prism erecting assembly for viewing an erect image of a subject in the viewfinder of the camera.

The Porro prism assembly 7 in the viewfinder 3 permits an erect image of the subject being photographed to be viewed through the finder lens 5. A single Porro prism would erect the image, but would leave it reversed left to right. To correct for this, as shown in FIGS. 1 and 2, there is provided two Porro prisms 77 and 79 which are placed hypotenuse to hypotenuse and at right angles to each other. FIG. 2 illustrates the optical path O-2 through the two Porro prisms 77 and 79 to an eyelens 81. In essence, the two reflecting surfaces 83 and 85 of the prims 77 and the two reflecting surfaces 87 and 89 of the prism 79 cooperate to turn the image focused by the finder lens 5 upright as well as right-way-round.

Figure 5A:
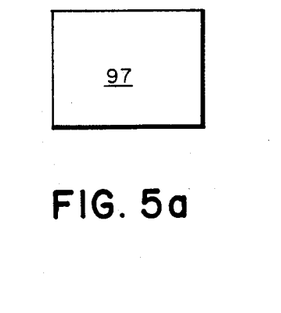
FIGS. 5a and 5b are elevation views of the finder field in the viewfinder, illustrating operation of a liquid crystal display masking unit for partially masking the finder field to provide a pseudo panoramic format.
Figure 5B:
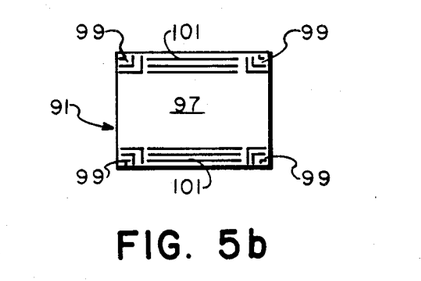

A liquid crystal display (LCD) masking unit 91 is located between the respective opposite halves of hypotenuse surfaces 93 and 95 of the two Porro prisms 77 and 79. The LCD masking unit is a variation of a known type of unit, such as described in U.S. Pat. No. 4,478,493, granted Oct. 23, 1984, and is depicted in FIG. 5B in a masking configuration in the finder field 97 of the viewfinder 3. The masking configuration corresponds to the panoramic setting of the cam ring 23 for the objective lens 1 and the similar setting of the cam ring 55 for the finder lens 5. As shown in FIG. 5B, the masking unit 91 comprises four sets of right-angle insulated strips 99 of transparent, electrically conductive material arranged in side-by-side relation in the respective corner zones of the finder field 97 and two sets of elongate insulated strips 101 of the same material arranged in side-by-side relation in the upper and lower marginal zones of the finder field. Preferably, each set of the right-angle strips 99 includes three strips, and each set of the elongate strips 101 includes three strips. FIG. 5A illustrates the finder field 97 as it appears with the masking unit 91 de-energized, which is the situation when the cam rings 23 and 55 are rotated from their 35 mm settings to their 200 mm settings or vice-versa. In this instance, the right-angle strips 99 and the elongate strips 101 are not visible in the finder field 97. FIG. 5B illustrates the finder field 97 as it appears with the masking unit 91 energized to provide a pseudo panoramic format, which is the situation when the cam rings 27 and 55 are in their panoramic settings. In this instance, the elongate strips 101 in the upper and lower marginal zones and the right-angle strips 99 in the corner zones are opaque in the finder field 97.

In contrast to the electrically controlled LCD masking unit 91, a mechanically controlled masking unit may be provided in the viewfinder 3. An example of a mechanical unit is shown in U.S. Pat. No. 3,212,422, granted Oct. 19, 1965.

Four light emitting diodes (LED's) 103, 105, 107 and 109 are disposed in evenly spaced relation in the camera for selective energization to spot-expose various code fiducials in binary form on the film adjacent the frame section F, as shown in FIG. 3. Selective energization of the LED's 103, 105, 107 and 109 is controlled by individually closing respective switches SW1, SW2, SW3 and SW4. The closing of the switches SW1, SW2, SW3 or SW4 may be effected by a single closure member, not shown, on the cam ring 23, for example, as the cam ring is positioned selectively in its pseudo settings, i.e., pan, 120 mm, 160 mm and 200 mm. The binary form of the resulting code fiducial on the frame section F indicates the particular pseudo setting of the cam ring 23. When the cam ring 23 is in its pseudo panoramic setting, the switch SW1 is closed and the LED 103 is energized. Thus the binary form of the code fiducial is 1000. When the cam ring is in its 120 mm, 160 mm or 200 mm pseudo telephoto settings, the switches SW2, SW3 or SW4 are closed and the LED's 105, 107 or 109 are energized. Thus the binary form of the code fiducial is 0100, 0010 or 0001. When the cam ring 23 is rotated from its 35 mm setting to its 80 mm setting or vice-versa, the switches SW1-SW4 are open and none of the LED's are energized. Thus the binary form of the code fiducial is (in effect) 0000.

Although not shown, it may be desirable for the LED 103 to be energized each time the cam ring 23 is in a pseudo panoramic or pseudo telephoto setting. In this instance, the LED 103 would provide a reference or pseudo-indicator fiducial for use in the printing process and the LED's 105, 107 and 109 would provide the code fiducials. Thus, the various codings might be 1000, 1100, 1110 and 1111, for example.

Figure 7:
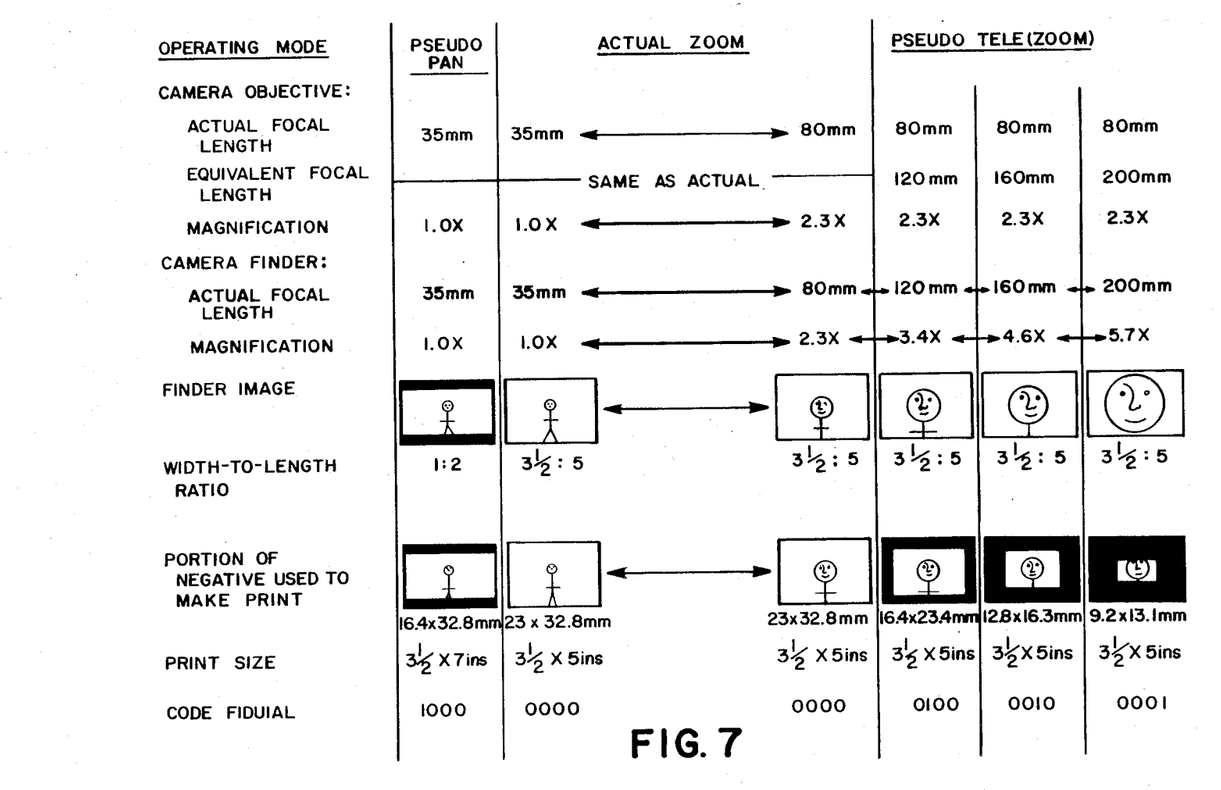
FIG. 7 is a chart for explaining how the camera is operated to take an exposure for use in producing a pseudo telephoto or pseudo panoramic print.

Referring now to FIG. 7, there is shown a chart for understanding how the camera is used to make exposures from which pseudo panoramic and pseudo telephoto prints as well as actual wide-angle to actual telephoto prints can be produced. For the most part, the chart is self-explanatory. For example, when the cam rings 23 and 55 are in their panoramic settings, the actual focal lengths of the objective lens 1 and the finder lens 5 are the wide angle limit 35 mm. The finder field 97 is masked as indicated in FIG. 7, and the code fiducial 1000 is exposed adjacnet the frame section F, in response to the closing of the switch SW1. During the printing operation, sensing of the code fiducial 1000 causes the negative to be masked along its upper and lower marginal zones in conformity with the masking of the finder field 97 as indicated in FIG. 7. An enlargement is made of the narrowed, unmasked portion of the negative, i.e., 16.4×32.8 mm, to provide a pseudo panoramic 3½×7 ins. print. When the cam rings 23 and 55 are in their 200 mm telephoto settings, the actual focal length of the objective lens 1 is its telephoto limit 80 mm, but the actual focal length of the finder lens 5 is 200 mm. Thus the finder field 97 is not masked, and the code fiducial 0001 is exposed adjacent the frame section F, in response to the closing of the switch SW4. During the printing operation, sensing of the code fiducial 0001 causes the negative to be masked along its upper, lower, left and right marginal zones as indicated in FIG. 7. An enlargement is made of the central, unmasked portion of the negative, i.e., 9.2×13.1 mm, to provide a pseudo telephoto 3½×5 ins. print. When the cam rings 23 and 25 are in their 120 mm telephoto settings, the actual focal length of the objective lens 1 is its telephoto limit 80 mm, but the actual focal length of the finder lens 5 is 120 mm. Thus the finder field 97 is not masked, and the code fiducial 0100 is exposed adjacent the frame section F, in response to the closing of the switch SW2. During the printing operation, sensing of the code fiducial 0100 causes the negative to be masked along its upper, lower, left and right marginal zones as indicated in FIG. 7. An enlargement is made of the central, unmasked portion of the negative, i.e., 16.4×23.4 mm, to provide a pseudo telephoto 3½×5 ins. print. When the cam rings 23 and 25 are rotated from their 35 mm settings to their 80 mm settings or vice-versa, the focal length of the objective lens 1 and the finder lens 5 are continuously changed between 35 mm and 80 mm. The finder field is not masked and no code fiducial (0000) is exposed adjacent the frame section F, since each of the switches SW1–SW4 is open. Thus an enlargement is made of a substantial portion of the negative, i.e., 23×32.8 mm.

Figure 6:
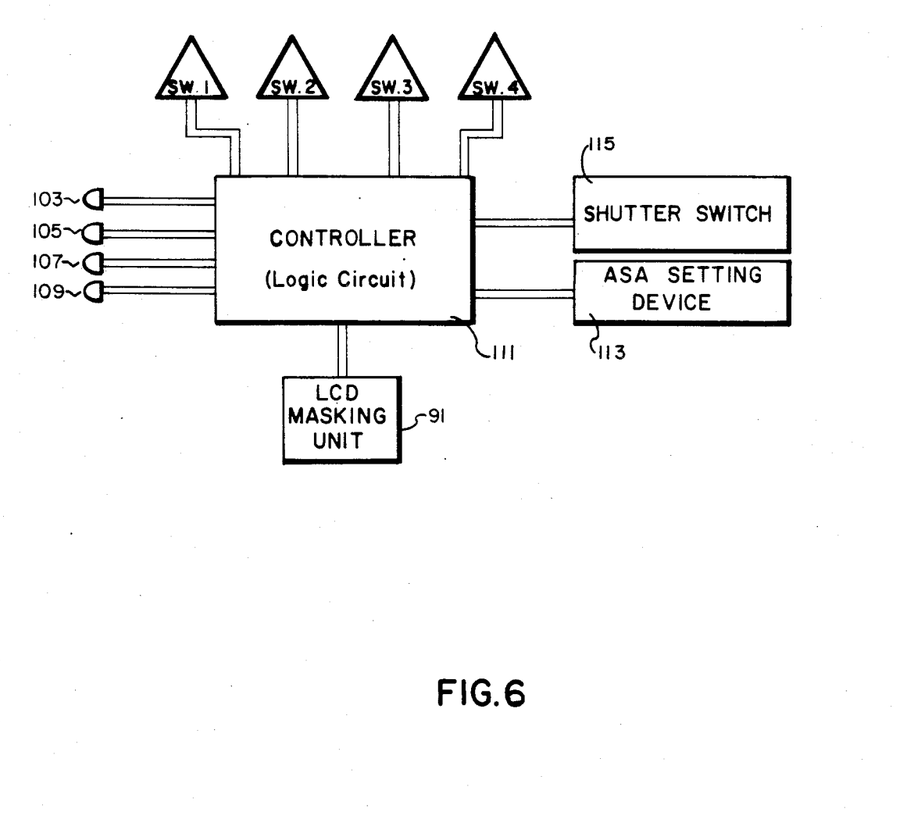
FIG. 6 is a diagram of control circuitry in the camera.

FIG. 6 depicts known controller means 111, that is, a logic circuit, for operating the LCD masking unit 91 and selectively energizing the LED's 103, 105, 107 or 109 in response to closing of the switches SW1, SW2, SW3 or SW4. An ASA (film speed) setting device 113 is connected to the controller 111 to limit the intensity of an energized LED in accordance with the film speed of the 35 mm film loaded in the camera. A shutter switch 115 is connected to the controller 111 to delay energization of an LED, even though one of the switches SW1–SW4 is closed, until a focal plane shutter, not shown, is opened to permit an exposure. When the focal plane shutter is opened, the shutter switch 115 is closed to energize an LED. Conversely, closing of the focal plane shutter causes the shutter switch 115 to re-open, thereby de-energizing the LED.

While the invention has been described with reference to a preferred embodiment, it will be understood that various modifications may be effected within the ordinary skill in the art without departing from the scope of the invention. For example, instead of including the direct-view viewfinder 3 in the camera, a single-lens reflex finder may be used with the invention. In this instance, the image of a subject to be photographed would be viewed in the finder, but through the objective lens. Moreover, although it is preferable to use a zoom type objective lens with the invention, it will be appreciated that a single or fixed focal length objective lens may be used instead.

I claim:

1. A photographic camera for taking exposures for use in producing pseudo telephoto prints, said camera comprising:
    an objective lens;
    a viewfinder adjustable to change the finder field of view to at least one actual telephoto field narrower than the possible field of view of said objective lens;
    means for adjusting said viewfinder to the narrower telephoto field; and
    means for encoding an exposure with code indicia representative of said narrower telephoto field of the viewfinder, whereby the portion of the exposure covered by the narrower telephoto field can be identified to produce a pseudo telephoto print.

2. A photographic camera for taking exposures for use in producing pseudo telephoto prints, said camera comprising:
    an objective lens having a telephoto limit;
    a viewfinder having a finder lens adjustable to change its angular field of view to at least one actual telephoto field narrower than the telephoto limit of said objective lens;
    means coupling said objective lens and said finder lens for adjusting the finder lens to said narrower telephoto field when the objective lens is at its telephoto limit; and
    means for encoding an exposure taken with said objective lens at its telephoto limit with code indicia representative of said narrower telephoto field of the finder lens, whereby the portion of the exposure covered by the narrower telephoto field can be identified to produce a pseudo telephoto print.

3. A photographic camera for taking exposures for use in producing pseudo telephoto prints, said camera comprising:
    an objective lens adjustable to change its angular field of view within a field range having a telephoto limit;
    a viewfinder having a finder lens adjustable to change its angular field of view to a plurality of telephoto fields outside said field range of the objective lens;
    means coupling said objective lens and said finder lens for adjusting the finder lens selectively to said telephoto fields when the objective lens is at its telephoto limit; and
    means for encoding an exposure taken with said objective lens at its telephoto limit with code indicia representative of a selected telephoto field of said finder lens, whereby the portion of the exposure covered by the selected telephoto field can be identified to produce a pseudo telephoto print.

4. A camera as recited in claim 3, wherein said encoding means is connected with said finder lens to encode an exposure in response to adjustment of the finder lens to a selected telephoto field.

5. A photographic camera for taking exposures for use in producing pseudo telephoto prints, said camera comprising:
    an objective lens adjustable to change its angular field of view within a field range having a telephoto limit;
    a direct-view viewfinder having a finder lens adjustable to change its angular field of view to respective fields within said field range of the objective lens and to a plurality of telephoto fields narrower than the possible fields of said objective lens;
    means coupling said objective lens and said finder lens for adjusting the finder lens and the objective lens selectively to similar fields to view a selected similar field through said finder lens and, when said objective lens is at its telephoto limit, for adjusting the finder lens selectively to said narrower telephoto fields to view a selected narrower telephoto field through said finder lens; and means, responsive to adjustment of said finder lens to a selected narrower telephoto field, for encoding an exposure taken with said objective lens at its telephoto limit with code indicia representative of the selected telephoto field, whereby the portion of the exposure covered by the selected telephoto field can be identified to produce a pseudo telephoto print.

6. A camera as recited in claim 5, wherein said coupling means includes cam means coupled to said objective lens and said finder lens for adjusting the respective lenses to change their angular fields of view, said cam means having dwell means for permitting said objective lens to remain stationary at its telephoto limit as the cam means adjusts said finder lens to a selected narrower telephoto field.

7. A photographic camera for taking exposures for use in producing pseudo telephoto prints, said camera comprising:

an objective lens adjustable to change its angular field of view within a field range having a telephoto limit;

a viewfinder having a finder lens adjustable to change its angular field of view to a plurality of actual telephoto fields narrower than the possible fields of said objective lens;

manually operated means, supported for movement to a plurality of positions corresponding to respective fields of said objective lens, for adjusting the objective lens to a selected field to take an exposure, and supported for movement to other positions corresponding to said narrower telephoto fields of the finder lens when the objective lens is at its telephoto limit, for adjusting said finder lens to a selected telephoto field to view the telephoto field; and means, responsive to movement of said manually operated means to a position corresponding to a selected telephoto field of said finder lens, for encoding an exposure taken with said objective lens at its telephoto limit with code indicia representative of the selected telephoto field, whereby the portion of the exposure covered by the selected telephoto field can be identified to produce a pseudo telephoto print.

8. A photographic camera for taking exposures for use in producing pseudo panoramic prints and pseudo telephoto prints, said camera comprising:

an objective lens adjustable to change its angular field of view within a field range having a wide angle limit and a telephoto limit;

a direct-view viewfinder having a finder lens adjustable to change its angular field of view to respective fields similar to the possible fields of said objective lens and to a plurality of telephoto fields narrower than the possible fields of the objective lens;

manually operated means, supported for movement to a plurality of positions corresponding to respective similar fields of said objective lens and said finder lens, for adjusting the finder lens and the objective lens to the same selected field to view the selected field through said finder lens, supported for movement to other positions corresponding to said narrower telephoto fields of the finder lens when said objective lens is at its telephoto limit, for adjusting said finder lens to a selected telephoto field to view the telephoto field through the finder lens, and supported for movement to a position corresponding to a panoramic field when the finder lens and the objective lens are at said wide angle limit:

means, responsive to movement of said manually operated means to the position corresponding to said panoramic field, for masking the angular field of said finder lens to view the panoramic field through the finder lens; and means, responsive to movement of said manually operated means to a position corresponding to said panoramic field or to a selected telephoto field, for encoding an exposure taken with said objective lens at its wide angle or telephoto limit with code indicia representative of the panoramic or telephoto field, whereby the portion of the exposure covered by the panoramic or telephoto field can be identified to produce a pseudo panoramic or pseudo telephoto print.

9. A camera as recited in claim 8, wherein said manually operated means includes cam means coupled to said objective lens and said finder lens for adjusting the respective lenses to change their angular fields of view, said cam means having dwell means for permitting the objective lens to remain stationary at said telephoto limit as the manually operated means is moved to the positions corresponding to said narrower telephoto fields of the finder lens and for permitting the objective lens and the finder lens to remain stationary at said wide angle limit as the manually operated means is moved to the position corresponding to said panoramic field.

* * * * *